May 2, 1933.  L. FLEISCHMANN  1,906,849
TOTALLY INCLOSED DYNAMO ELECTRIC MACHINE
Filed Aug. 25, 1931
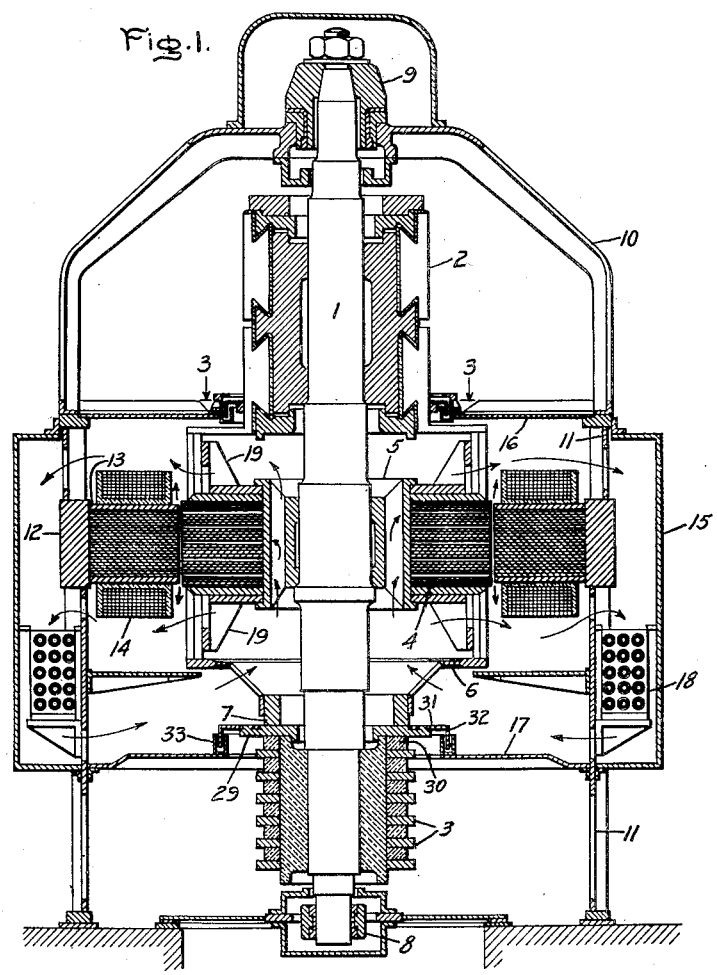
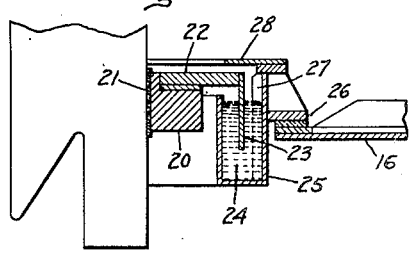
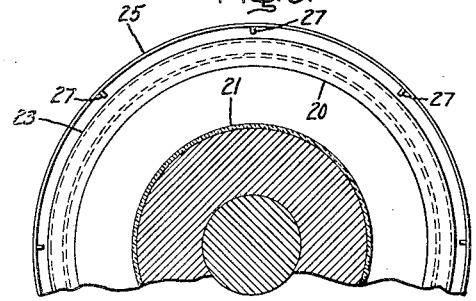
Inventor:
Lionel Fleischmann,
by Charles E. Tullar.
His Attorney.

Patented May 2, 1933

1,906,849

UNITED STATES PATENT OFFICE

LIONEL FLEISCHMANN, OF BERLIN-GRUNEWALD, GERMANY, ASSIGNOR TO GENERAL ELECTRIC COMPANY, A CORPORATION OF NEW YORK

TOTALLY-INCLOSED DYNAMO-ELECTRIC MACHINE

Application filed August 25, 1931, Serial No. 559,276, and in Germany August 30, 1930.

My invention relates to totally inclosed vertical shaft dynamo-electric machines, of the type having a shaft extending outside of an inclosing casing in which a suitable gas is circulated for cooling the machine during its operation.

The object of my invention is to provide a simplified sealing device to prevent leakage of the cooling gas from the casing along the shaft of a vertical shaft dynamo-electric machine. I accomplish this by providing a dynamo-electric machine having vertically arranged stationary and rotatable members inclosed in such manner that a gas-filled chamber is formed therefor, and a liquid seal between the rotatable member and the inclosing chamber including a rotatable element and a stationary element, one of the elements carrying a body of liquid and the other element extending into the body of liquid.

My invention will be more fully set forth in the following description referring to the accompanying drawing, and the features of novelty which characterize my invention will be pointed out with particularity in the claims annexed to and forming a part of this specification.

In the drawing Fig. 1 is a sectional view of a totally inclosed rotary converter of the vertical shaft type embodying my invention; Fig. 2 is an enlarged fragmentary sectional view of the device which I employ for sealing the opening between the rotatable member of the machine and the end wall of the casing; and Fig. 3 is a view taken on line 3—3 of Fig. 1.

Referring to the drawing, I have shown my invention in connection with a totally inclosed hydrogen cooled rotary converter of the vertical type.

The rotatable member of this machine includes a vertical shaft 1 having a commutator 2 and slip rings 3 thereon arranged adjacent opposite ends of the machine, and an armature winding arranged on a slotted laminated core 4 secured to a spider 5 mounted on the shaft 1, the armature winding being connected in the usual manner to the slip rings and the commutator. An annular baffle plate 6 is arranged adjacent the lower end of the armature, and is carried by a collar 7 arranged on the shaft 1, for directing the gas into the end of the armature.

The vertical shaft 1 is journaled in a bearing 8 below the slip rings 3, and a thrust bearing 9 provided with a supporting bracket 10 secured to frame 11 of the machine. The stationary member of the machine includes an external field ring 12 having laminated pole pieces 13 provided with windings 14. The stationary member and armature of the machine are inclosed by a cylindrical casing 15 to form a gas filled chamber therefore, having an upper end wall 16 and a lower end wall 17. Fans 19 carried by the armature circulate the cooling gas, such as hydrogen, through the armature, about the stationary member, and over coolers 18 through which cooling water is circulated as indicated by the arrows in Fig. 1.

In accordance with my invention leakage of the cooling gas from the casing along the shaft is prevented by providing a liquid sealing device between each end wall of the casing and the vertical rotatable member. Each of these seals includes a rotatable element and a stationary element, one of the elements, preferably the stationary element, carrying a body of liquid and the other element extending into the body of liquid.

Referring to Fig. 2, the rotatable element of the upper seal includes a collar 20 secured to and insulated from the commutator 2, as indicated at 21, and to it is secured an annular plate 22 having a ring 23 attached to the outer periphery thereof. The ring 23 of the rotatable element extends downwardly into a body of liquid 24, such as mercury, oil, or the like, carried by an annular U-shaped trough 25 of the stationary element, which is secured to the upper end wall 16 as indicated at 26. The stationary element is provided with vertical baffles 27 extending inwardly from the walls of the trough 25, so that there is only a small clearance between their inner edges and the ring 23, as shown in Figs. 2 and 3. This prevents the liquid from being whirled by the rotation of the ring 23 which might cause it to splash out of the trough. In order to prevent any foreign matter from getting into the liquid 24 an annular ledge 28 is provided which extends inwardly from the top of the outer wall of the trough 25.

The rotatable element of the lower seal includes a disk 29 secured to and insulated from the slip rings as indicated at 30, and to it is secured an annular plate 31 having a ring 32 attached to the outer periphery thereof. The ring 32 extends downwardly into a body of liquid carried by a U-shaped trough 33, which is secured to the lower end wall 17, in the same manner as described above for the upper seal. The lower seal is also provided with vertical baffles in the stationary element to prevent whirling of the liquid by the rotation of the ring 32.

Although I have shown my invention in connection with a rotary converter, I do not desire my invention to be limited to the particular arrangement set forth, and I intend in the following claims to cover all modifications which do not depart from the spirit and scope of my invention.

What I claim as new and desire to secure by Letters Patent of the United States, is:—

1. A dynamo-electric machine having a stationary and a vertical rotatable member including a current collecting device arranged adjacent one end thereof, means for inclosing said members to provide a gas filled chamber therefor, a liquid seal about said rotatable member including a rotatable element secured thereto and arranged between said current collecting device and said inclosing means, and a stationary element carrying a body of liquid and secured to the end of said inclosing means adjacent the current collecting device, said rotatable element extending into said body of liquid and being spaced from said stationary element.

2. A dynamo-electric machine having a stationary and a vertical rotatable member including a current collecting device arranged adjacent one end thereof, means for inclosing said members to provide a gas filled chamber therefor, and a liquid seal about said rotatable member including a rotatable element secured to and insulated from said current collecting device, and a stationary element having an annular trough containing a body of liquid and secured to the end of said inclosing means adjacent the current collecting device, said rotatable element extending into said body of liquid and being spaced from said stationary element.

3. A dynamo-electric machine having a stationary member and a rotatable member including a vertical shaft, current collecting devices mounted on said shaft and arranged at opposite ends of said rotatable member, means for inclosing said members to provide a gas filled chamber therefor, and a liquid seal about each of said current collecting devices including rotatable elements secured thereto and stationary elements having annular troughs containing liquid and provided with baffles to prevent the whirling of liquid in said troughs, said stationary elements being secured to the ends of said inclosing means adjacent said current collecting devices, said rotatable elements being spaced from said troughs and extending into the liquid therein.

In witness whereof, I have hereto set my hand.

LIONEL FLEISCHMANN.